US010635800B2

(12) United States Patent
Bakish

(10) Patent No.: US 10,635,800 B2
(45) Date of Patent: Apr. 28, 2020

(54) SYSTEM, DEVICE, AND METHOD OF VOICE-BASED USER AUTHENTICATION UTILIZING A CHALLENGE

(71) Applicant: VocalZoom Systems Ltd., Yokneam Illit (IL)

(72) Inventor: Tal Bakish, Modi'in (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 0 days.

(21) Appl. No.: 15/950,178

(22) Filed: Apr. 11, 2018

(65) Prior Publication Data

US 2018/0232511 A1 Aug. 16, 2018

Related U.S. Application Data

(63) Continuation-in-part of application No. 15/175,063, filed on Jun. 7, 2016, now Pat. No. 10,311,219.

(51) Int. Cl.
*G06F 21/00* (2013.01)
*G06F 21/32* (2013.01)
*H04L 9/32* (2006.01)
*G06F 21/62* (2013.01)
*G10L 21/0324* (2013.01)
(Continued)

(52) U.S. Cl.
CPC .......... *G06F 21/32* (2013.01); *G06F 21/6218* (2013.01); *G07C 9/00158* (2013.01); *G10L 17/22* (2013.01); *G10L 21/0324* (2013.01); *H04L 9/3231* (2013.01);
(Continued)

(58) Field of Classification Search
CPC ... G06F 21/32; G06F 21/6218; H04L 9/3231; H04L 9/3271; G10L 17/22; G10L 21/0324; G10L 15/20; G10L 2021/03646; G07C 9/00158
See application file for complete search history.

(56) References Cited

U.S. PATENT DOCUMENTS 8,571,871 B1 * 10/2013 Stuttle ................. G10L 13/033
704/260
2004/0249633 A1 * 12/2004 Asseily ................. H04R 1/342
704/200
(Continued)

OTHER PUBLICATIONS

Kwak et al., Robust Formant Features for Speaker Verification in the Lombard Effect, APSIPA. Dec. 2015.*
(Continued)

*Primary Examiner* — David Garcia Cervetti
(74) *Attorney, Agent, or Firm* — Eitan Mehulal Sadot

(57) ABSTRACT

Device, system, and method of voice-based user authentication utilizing a challenge. A system includes a voice-based user-authentication unit, to authenticate a user based on a voice sample uttered by the user. A voice-related challenge generator operates to generate a voice-related challenge that induces the user to modify one or more vocal properties of the user. A reaction-to-challenge detector operates to detect a user-specific vocal modification in reaction to the voice-related challenge; by using a processor as well as an acoustic microphone, an optical microphone, or a hybrid acoustic-and-optical microphone. The voice-based user-authentication unit utilizes the user-specific vocal modification, that was detected as reaction to the voice-related challenge, as part of a user-authentication process.

16 Claims, 3 Drawing Sheets

(51) Int. Cl.
*G07C 9/00* (2020.01)
*G10L 17/22* (2013.01)
*G10L 21/0364* (2013.01)
*G10L 15/20* (2006.01)

(52) U.S. Cl.
CPC ............ *H04L 9/3271* (2013.01); *G10L 15/20* (2013.01); *G10L 2021/03646* (2013.01)

(56) References Cited

U.S. PATENT DOCUMENTS

| | | | |
|---|---|---|---|
| 2005/0075875 A1* | 4/2005 | Shozakai | G06K 9/00335 704/231 |
| 2007/0233483 A1* | 10/2007 | Kuppuswamy | G10L 17/20 704/247 |
| 2007/0266154 A1* | 11/2007 | Ohta | G06F 21/316 709/225 |
| 2009/0012785 A1* | 1/2009 | Chengalvarayan | G10L 15/02 704/231 |
| 2010/0158219 A1* | 6/2010 | Dhawan | H04M 1/2478 379/88.18 |
| 2010/0217594 A1* | 8/2010 | Sawada | G06F 21/32 704/246 |
| 2012/0290297 A1* | 11/2012 | Baughman | G10L 17/22 704/233 |
| 2013/0097682 A1* | 4/2013 | Zeljkovic | H04L 9/3234 726/7 |
| 2013/0152002 A1* | 6/2013 | Menczel | G06F 3/0488 715/765 |
| 2013/0225128 A1* | 8/2013 | Gomar | H04W 12/06 455/411 |
| 2013/0311190 A1* | 11/2013 | Reiner | G10L 25/48 704/270 |
| 2014/0282958 A1* | 9/2014 | Salonen | H04L 63/0861 726/7 |
| 2015/0011195 A1* | 1/2015 | Li | H03G 3/3026 455/418 |
| 2015/0056952 A1* | 2/2015 | Mintz | H04M 1/72569 455/411 |
| 2015/0178486 A1* | 6/2015 | Bentley | G06F 21/32 726/5 |
| 2016/0234206 A1* | 8/2016 | Tunnell | H04W 4/70 |
| 2017/0187866 A1* | 6/2017 | Li | H04M 1/72572 |
| 2017/0244700 A1* | 8/2017 | Yap | H04L 63/0861 |
| 2019/0156836 A1* | 5/2019 | Saeidi | G10L 17/04 |

OTHER PUBLICATIONS

Lombard et al., TDOA Estimation for Multiple Sound Sources in Noisy and Reverberant Environments Using Broadband Independent Component Analysis, IEEE, Aug. 2011.*

* cited by examiner

SYSTEM, DEVICE, AND METHOD OF VOICE-BASED USER AUTHENTICATION UTILIZING A CHALLENGE

CROSS-REFERENCE TO RELATED APPLICATIONS

This application is a Continuation-in-Part (CIP) of United States patent application number U.S. Ser. No. 15/175,063, filed on Jun. 7, 2016, which is hereby incorporated by reference in its entirety.

FIELD

The present invention relates to the field of microphones.

BACKGROUND

Millions of people users worldwide utilize a variety of electronic devices that may receive, capture or otherwise process audio signals. For example, cellular phones and smartphones comprise an audio microphone, allowing a user to conduct a telephone call with a remote user. Similarly, a smartphone typically comprises an audio microphone and a video camera, allowing the user to record an audio/video clip. Additionally, many laptop computers as well as tablets are typically equipped with an audio microphone able to capture audio.

Unfortunately, an audio microphone typically captures a desired audio signal (e.g., a voice of a human speaker) together with background noise, ambient noises, environmental noises, and/or audio from other non-desired sources.

SUMMARY

Some embodiments of the present invention may provide systems, devices, and methods that comprise or utilize an acoustic microphone, a laser microphone, a laser-based microphone, an optical microphone, a hybrid acoustic-and-optical microphone, a hybrid acoustic-and-optical sensor, and/or other types of microphones and/or sensors.

Some embodiments may comprise a device, system, and method of user authentication utilizing an acoustic microphone and/or optical microphone and/or laser-based microphone. For example, an optical microphone transmits an outgoing optical signal or laser beam towards a face of a human speaker; receives an incoming optical feedback that is reflected back from the face of the human speaker; performs self-mix interferometry that is based on the outgoing optical signal and the incoming reflected optical signal; and generates a user-specific feature or characteristic that uniquely characterizes said human speaker. A user authentication module operates to authenticate the user for performing a privileged or an access-controlled action, based on the user-specific characteristic that was generated, optionally in combination with one or more biometric features or authentication requirements.

Some embodiments of the present invention may comprise systems, devices, and methods of user authentication, user identification, user differentiation (e.g., differentiating or distinguishing among two or more users), as well as for selectively authorizing or un-authorizing an access of a user to a privileged device or system or area or service. The user authentication techniques may be performed based exclusively on optical signal processing by the optical microphone; or may be performed based on a combination of two or more parameters or processes, for example, based on a combination of (i) the optical signal processing by the optical microphone, and (ii) other user-specific features or other biometric characteristics of a user (e.g., user voice; user image; user fingerprint).

In some embodiments, an optical microphone or a laser microphone may transmit a laser beam towards a face area of a human speaker; and may receive reflected optical feedback that may be reflected from the face area of the human speaker, and particularly from face-regions that vibrate while the human speaker speaks. A self-mix (SM) chamber, a self-mix interferometer unit, a vibrometer, or other suitable component may analyze the received optical chamber, in order to remotely determine or to estimate an audio signal uttered by the human speaker, based on the received optical feedback.

In some embodiments, the optical signal may be utilized for user authentication purposes, for example, to authenticate a user, to authenticate identity of a user, to authorize or to un-authorize access of a user to a privileged service or device or location, and/or as a biometric feature or user-specific characteristic which may be utilized for user authentication and/or user identification, by itself, and/or in combination with other biometric features and/or other user-specific characteristics (e.g., user image, user voice, user fingerprint, or the like).

In some embodiments, an optical sensor or optical microphone (or a hybrid optical-and-acoustic sensor, or a hybrid optical-and-acoustic microphone), may extract one or more user-specific patterns or parameters or features; which may then be utilized for user authentication or user identification, optionally in conjunction with other user-specific characteristics or biometric feature(s). The extracted parameters may further assist a system to combat or prevent attacks by impostors, human impostors and/or machine-based emulators, which may content to be the "genuine" user or the "legitimate" human user. The system may further be used to verify or confirm or ascertain Liveness of the user that attempts to authenticate, and/or may reduce or prevent attempts to utilize forged or fake credentials, duplicate or cloned or previously-captured credentials, imitation credentials, utilization of replay attacks, or the like.

The present invention may provide other and/or additional advantages and/or benefits.

DETAILED DESCRIPTION OF SOME DEMONSTRATIVE EMBODIMENTS

Figure 1A:
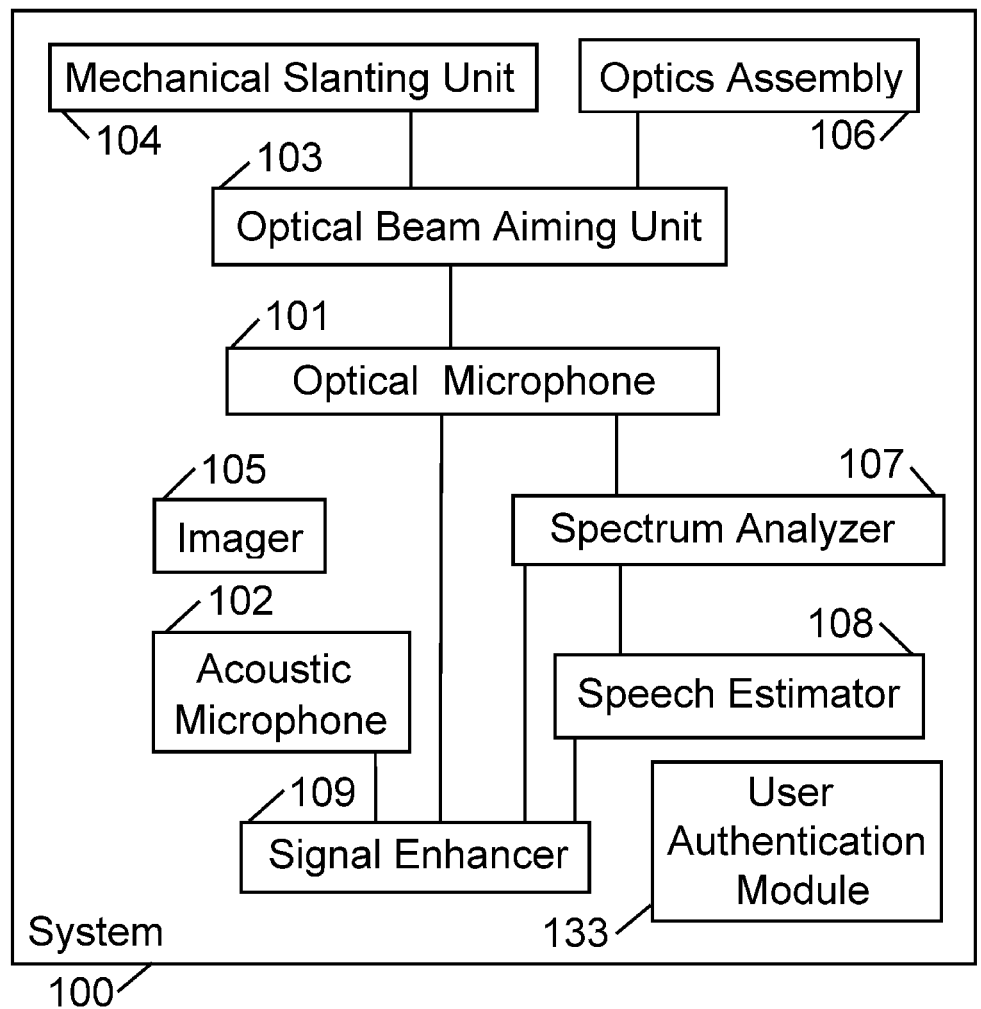
FIG. 1A is a schematic illustration of a system, in accordance with some demonstrative embodiments of the present invention.

The terms "laser" or "laser transmitter" as used herein may comprise or may be, for example, a stand-alone laser transmitter, a laser transmitter unit, a laser generator, a component able to generate and/or transmit a laser beam or a laser ray, a laser drive, a laser driver, a laser transmitter associated with a modulator, a combination of laser transmitter with modulator, a combination of laser driver or laser drive with modulator, or other suitable component able to generate and/or transmit a laser beam.

The term "acoustic microphone" as used herein, may comprise one or more acoustic microphone(s) and/or acoustic sensor(s); or a matrix or array or set or group or batch or arrangement of multiple such acoustic microphones and/or acoustic sensors; or one or more sensors or devices or units or transducers or converters (e.g., an acoustic-to-electric transducer or converter) able to convert sound into an electrical signal; a microphone or transducer that utilizes electromagnetic induction (e.g., a dynamic microphone) and/or capacitance change (e.g., a condenser microphone) and/or piezoelectricity (e.g., a piezoelectric microphones) in order to produce an electrical signal from air pressure variations; a microphone that may optionally be connected to, or may be associated with or may comprise also, a pre-amplifier or an amplifier; a carbon microphone; a carbon button microphone; a button microphone; a ribbon microphone; an electret condenser microphone; a capacitor microphone; a magneto-dynamic microphone; a dynamic microphone; an electrostatic microphone; a Radio Frequency (RF) condenser microphone; a crystal microphone; a piezo microphone or piezoelectric microphone; and/or other suitable types of audio microphones, acoustic microphones and/or sound-capturing microphones.

The term "laser microphone" as used herein, may comprise, for example: one or more laser microphone(s) or sensor(s); one or more laser-based microphone(s) or sensor(s); one or more optical microphone(s) or sensor(s); one or more microphone(s) or sensor(s) that utilize coherent electromagnetic waves; one or more optical sensor(s) or laser-based sensor(s) that utilize vibrometry, or that comprise or utilize a vibrometer; one or more optical sensor(s) and/or laser-based sensor(s) that comprise a self-mix module, or that utilize self-mixing interferometry measurement technique (or feedback interferometry, or induced-modulation interferometry, or backscatter modulation interferometry), in which a laser beam is reflected from an object, back into the laser, and the reflected light interferes with the light generated inside the laser, and this causes changes in the optical and/or electrical properties of the laser, and information about the target object and the laser itself may be obtained by analyzing these changes.

The terms "vibrating" or "vibrations" or "vibrate" or similar terms, as used herein, refer and include also any other suitable type of motion, and may not necessarily require vibration or resonance per se; and may include, for example, any suitable type of motion, movement, shifting, drifting, slanting, horizontal movement, vertical movement, diagonal movement, one-dimensional movement, two-dimensional movement, three-dimensional movement, or the like.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention.

In some embodiments, optionally, a human speaker or a human user may be requested to wear sunglasses or protective eye-gear or protective goggles, in order to provide additional safety to the eyes of the human user which may occasionally be "hit" by such generally-safe laser beam, as an additional precaution.

In some embodiments which may utilize a laser microphone or optical microphone, such optical microphone (or optical sensor) and/or its components may be implemented as (or may comprise) a Self-Mix module; for example, utilizing a self-mixing interferometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes. In some embodiments, the optical microphone or laser microphone operates to remotely detect or measure or estimate vibrations of the skin (or the surface) of a face-point or a face-region or a face-area of the human speaker (e.g., mouth, mouth-area, lips, lips-area, cheek, nose, chin, neck, throat, ear); and/or to remotely detect or measure or estimate the direct changes in skin vibrations; rather than trying to measure indirectly an effect of spoken speech on a vapor that is exhaled by the mouth of the speaker, and rather than trying to measure indirectly an effect of spoken speech on the humidity or relative humidity or gas components or liquid components that may be produced by the mouth due to spoken speech.

The present invention may be utilized in, or with, or in conjunction with, a variety of devices or systems that may benefit from noise reduction and/or speech enhancement; for example, a smartphone, a cellular phone, a cordless phone, a video conference system or device, a tele-conference system or device, an audio/video camera, a web-camera or web-cam, a landline telephony system, a cellular telephone system, a voice-messaging system, a Voice-over-IP system or network or device, a vehicle, a vehicular dashboard, a vehicular audio system or microphone, a navigation device or system, a vehicular navigation device or system, a mapping or route-guidance device or system, a vehicular route-guidance or device or system, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, an Internet of Things (IoT) device or appliance, an Internet-connected device or appliance, a wireless-connected device or appliance, a device or system or module that utilizes speech-based commands or audio commands, a device or system that captures and/or records and/or processes and/or analyzes audio signals and/or speech and/or acoustic signals, and/or other suitable systems and devices.

Some embodiments of the present invention may provide or may comprise a laser-based device or apparatus or system, a laser-based microphone or sensor, a laser microphone or sensor, an optical microphone or sensor, a hybrid acoustic-optical sensor or microphone, a combined acoustic-optical sensor or microphone, and/or a system that comprises or utilizes one or more of the above.

Reference is made to FIG. 1A, which is a schematic block-diagram illustration of a system 100, in accordance with some demonstrative embodiments of the present invention.

System 100 may comprise, for example, an optical microphone 101 able to transmit an optical beam (e.g., a laser beam) towards a target 199 (e.g., a face of a human speaker), and able to capture and analyze the optical feedback that is reflected from the target 199, particularly from vibrating regions or vibrating face-regions or face-portions of the human speaker. The optical microphone 101 may be or may comprise or may utilize a Self-Mix (SM) chamber or unit, an interferometry chamber or unit, an interferometer, a vibrometer, a targeted vibrometer, or other suitable component, able to analyze the spectrum of the received optical signal with reference to the transmitted optical beam, and able to remotely estimate the audio or speech or utterances generated by the target 199 (e.g., the human speaker).

Optionally, system 100 may comprise an acoustic microphone 102 or an audio microphone, which may capture audio. Optionally, the analysis results of the optical feedback may be utilized in order to improve or enhance or filter the captured audio signal; and/or to reduce or cancel noise(s) from the captured audio signal. Optionally, system 100 may be implemented as a hybrid acoustic-and-optical sensor, or as a hybrid acoustic-and-optical sensor. In other embodiments, system 100 need not necessarily comprise an acoustic microphone. In yet other embodiments, system 100 may comprise optical microphone 102 and may not comprise any acoustic microphones, but may operate in conjunction with an external or a remote acoustic microphone.

System 100 may further comprise an optical beam aiming unit 103 (or tilting unit, or slanting unit, or positioning unit, or targeting unit, or directing unit), for example, implemented as a laser beam directing unit or aiming unit or other unit or module able to direct a transmitted optical beam (e.g., a transmitted laser beam) towards target 199, and/or able to fine-tune or modify the direction of such optical beam or laser beam. The directing or alignment of the optical beam or laser beam, towards the target 199, may be performed or achieved by using one or more suitable mechanisms.

In a first example, the optical microphone 101 may be fixedly mounted or attached or located at a first location or point (e.g., on a vehicular dashboard; on a frame of a screen of a laptop computer), and may generally point or be directed towards an estimated location or a general location of a human speaker that typically utilizes such device (e.g., aiming or targeting an estimated general location of a head of a driver in a vehicle; or aiming or targeting an estimated general location of a head of a laptop computer user); based on a fixed or pre-mounted angular slanting or positioning (e.g., performed by a maker of the vehicular dashboard or vehicle, or by the maker of the laptop computer).

In a second example, the optical microphone may be mounted on a wall of a lecture hall; and may be fixedly pointing or aiming its laser beam or its optical beam towards a general location of a stage or a podium in that lecture hall, in order to target a human speaker who is a lecturer.

In a third example, a motor or engine or robotic arm or other mechanical slanting unit 104 may be used, in order to align or slant or tilt the direction of the optical beam or laser beam of the optical microphone, towards an actual or an estimated location of a human speaker; optionally via a control interface that allows an administrator to command the movement or the slanting of the optical microphone towards a desired target (e.g., similar to the manner in which an optical camera or an imager or a video-recording device may be moved or tilted via a control interface, a pan-tilt-zoom (PTZ) interface, a robotic arm, or the like).

In a fourth example, an imager 105 or camera may be used in order to capture images or video of the surrounding of the optical microphone; and a face-recognition module or image-recognition module or a face-identifying module or other Computer Vision algorithm or module may be used in order to analyze the captured images or video and to determine the location of a human speaker (or a particular, desired, human speaker), and to cause the slanting or aiming or targeting or re-aligning of the optical beam to aim towards the identified human speaker. In a fifth example, a human speaker may be requested to wear or to carry a particular tag or token or article or object, having a pre-defined shape or color or pattern which is not typically found at random (e.g., tag or a button showing a green triangle within a yellow square); and an imager or camera may scan an area or a surrounding of system 100, may analyze the images or video to detect or to find the pre-defined tag, and may aim the optical microphone towards the tag, or towards a pre-defined or estimated offset distance from that tag (e.g., a predefined K degrees of slanting upwardly or vertically relative to the detected tag, if the human speaker is instructed to carry the tag or to wear the tag on his jacket pocket).

In a sixth example, an optics assembly 106 or optics arrangement (e.g., one or more mirrors, flat mirrors, concave mirrors, convex mirrors, lenses, prisms, beam-splitters, focusing elements, diffracting elements, diffractive elements, condensing elements, and/or other optics elements or optical elements) may be utilized in order to direct or aim the optical beam or laser beam towards a known or estimated or general location of a target or a speaker or a human face. The optics assembly may be fixedly mounted in advance (e.g., within a vehicle, in order to aim or target a vehicular optical sensor towards a general-location of a driver face), or may be dynamically adjusted or moved or tilted or slanted based on real-time information regarding the actual or estimated location of the speaker or his head (e.g., determined by using an imager, or determined by finding a Signal to Noise Ratio (SNR) value that is greater than a threshold value).

In a seventh example, the optical microphone may move or may "scan" a target area (e.g., by being moved or slanted via the mechanical slanting unit 104); and may remain at, or may go-back to, a particular direction in which the Signal to Noise Ratio (SNR) value was the maximal, or optimal, or greater than a threshold value.

In an eighth example, particularly if the human speaker is moving on a stage or moving in a room, or moves his face to different directions, the human speaker may be requested or required to stand at a particular spot or location in order to enable the system to efficiently work (e.g., similarly to the manner in which a singer or a performer is required to stand in proximity to a wired acoustic microphone which is mounted on a microphone stand); and/or the human speaker may be requested or required to look to a particular direction or to move his face to a particular direction (e.g., to look directly towards the optical microphone) in order for the system to efficiently operate (e.g., similar to the manner in which a singer or a performer may be requested to look at a camera or a video-recorder, or to put his mouth in close proximity to an acoustic microphone that he holds).

Other suitable mechanisms may be used to achieve or to fine-tune aiming, targeting and/or aligning of the optical beam with the desired target.

It is clarified that the optical microphone and/or the system of the present invention, need not be continuously aligned with the target or the human speaker, and need not necessarily "hit" the speaker continuously with laser beam or optical beam. Rather, in some embodiments, the present invention may operate only during time-periods in which the optical beam or laser beam actually "hits" the face of the speaker, or actually causes reflection of optical feedback from vibrating face-regions of the human speaker. In some embodiments, the system may operate or may efficiently operate at least during time period(s) in which the laser beam(s) or the optical signal(s) actually hit (or reach, or touch) the face or the mouth or the mouth-region of a speaker; and not in other time-periods or time-slots. In some embodiments, the system and/or method need not necessarily provide continuous speech enhancement or continuous noise reduction or continuous speech detection; but rather, in some embodiments the speech enhancement and/or noise reduction and/or speech detection may be achieved in those specific time-periods in which the laser beam(s) actually hit the face of the speaker and cause a reflection of optical feedback from vibrating surfaces or face-regions. In some embodiments, the system may operate only during such time periods (e.g., only a few minutes out of an hour; or only a few seconds out of a minute) in which such actual "hit" of the laser beam with the face-region is achieved. In other embodiments, continuous or substantially-continuous noise reduction and/or speech enhancement may be achieved; for example, in a vehicular system in which the laser beam is directed towards the location of the head or the face of the driver.

In accordance with the present invention, the optical microphone 101 may comprise a self-mix chamber or unit or self-mix interferometer or a targeted vibrometer, and may utilize reflected optical feedback (e.g., reflected feedback of a transmitted laser beam) in order to remotely measure or estimate vibrations of the facial skin or facial-regions head-regions of a human speaker, utilizing a spectrum analyzer 107 in order to analyze the optical feedback with reference to the transmitted optical feedback, and utilizing a speech estimator unit 108 to estimate or extract a signal that corresponds to speech or audio that is generated or uttered by that human speaker.

Optionally, system 100 may comprise a signal enhancer 109, which may enhance, filter, improve and/or clean the acoustic signal that is captured by acoustic microphone 102, based on output generated by the optical microphone 101. For example, system 100 may dynamically generate and may dynamically apply, to the acoustic signal captured by the acoustic microphone 102, a digital filter which may be dynamically constructed by taking into account the output of the optical microphone 101, and/or by taking into account an analysis of the optical feedback or optical signal(s) that are reflected back from the face of the human speaker.

System 100 may further comprise a user authentication module 133, which may be integrated with or integral to system 100, or which may be otherwise associated with or coupled to system 100, or which may be connected to system 100 (e.g., via a wired communication link and/or wireless communication link). User authentication module 133 may perform user authentication and/or user identification, based on (at least partially; or entirely) the output of the optical microphone 102. For example, user authentication module 133 may authenticate (or un-authenticate) a user based on a match (or a mismatch) between fresh, current, characteristics that are revealed from the reflected optical signal, and previously-extracted characteristics that were previously deduced from a prior usage session of a previously-authenticated user. The user authentication module 133 may take into account the current, fresh, output of the optical microphone 102; and optionally, also, one or more other user-specific features or biometric characteristics (e.g., voice sample; fingerprint; user image), in order to reach an authentication decision.

User authentication module 133, as well as system 100, may be utilized in order to allow or disallow access of a user to a variety of devices or services; for example: to access or to start engaging with a computer or smartphone or tablet or other electronic device; to access or to ignite a vehicle; to access a building or a room or other location; to pass through a gate or entry or exit or turnstile; to access an offline service (e.g., a locally-running application); to access a remote service or an online service or website or webpage, through a Web browser or through a native application; to access an Automatic Teller Machine (ATM) or other kiosk type machine; to access a banking website or service, or a brokerage website or service; and/or for various other purposes, and in conjunction with various other systems and devices.

Figure 1B:
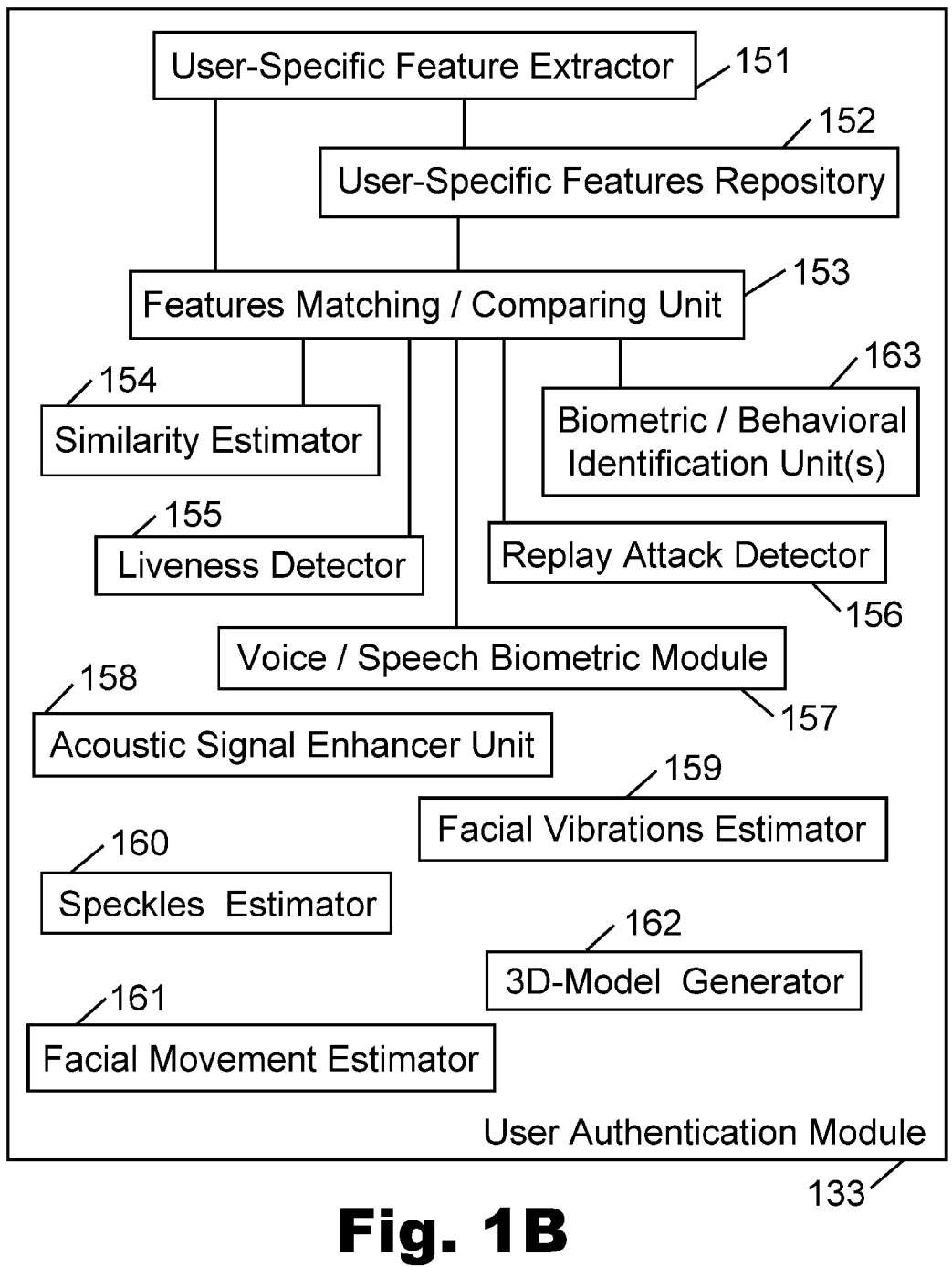
FIG. 1B is a schematic block-diagram illustration of a user authentication module, in accordance with some demonstrative embodiments of the present invention.

In order to not over-crowd FIG. 1A with components and elements, reference is now made to FIG. 1B, which is a schematic block-diagram illustration of the user authentication module 133 and its components, in accordance with some demonstrative embodiments of the present invention. It is clarified that some or all of the components that are shown in FIG. 1B, may be included within system 100 of FIG. 1A; and/or optionally, may be located or co-located within other modules or other units of system 100 FIG. 1A; and/or may be located in other devices which may be in communication with, or connected to, system 100 of FIG. 1A.

User authentication module 133 may comprise a user-specific feature extractor 151 able to extract a user-specific characteristic or feature or pattern or signal or indicator, from the received or reflected optical signal, and/or from the output of the optical microphone 101, and/or from the self-mix interferometry or remote vibrometry performed by the optical microphone. For example, Applicants have realized that each human speaker may speak and may utter speech in a different manner (e.g., moving his lips or face or chin in a particular and user-specific manner), and/or that each human speaker may cause different type, strength, amplitude, intensity, frequency and/or other characteristics of vibrations of the face or facial-region or skin or skin-region or mouth or mouth-surrounding-region, which thus may cause a different and/or distinguishing reflection of optical signal or laser beam(s); thereby enabling the user-specific feature extractor 151 to extract such unique user-specific feature based on such reflected optical signal and/or its self-mix with the transmitted signal or with a replication of the transmitted signal.

The extracted user-specific characteristic may be stored or may be securely stored, in a user-specific features repository 152; for example, locally (e.g., in a storage unit or memory unit which may be co-located with the optical microphone 101 or in proximity thereto) and/or remotely (e.g., in a remote server or repository, or in a "big data" repository or a "cloud computing" repository) and/or in other suitable storage device or memory unit (e.g., in an organizational server or enterprise server computer; in a smartphone or tablet or smart-watch). The data stored in the user-specific features repository may indicate one or more identifiers or data-items about the user from whom the data was collected (e.g., name, date-of-birth, employee number, user-name, or the like), as well as a representation of the user-specific feature that was extracted (e.g., as a digital signature, digital profile, one or more numerical values, one or more strings).

Optionally, one or more portions of the data may also be stored (e.g., raw data describing the reflected optical signal, and/or raw data reflecting the self-mix signal, and/or data indicating processed or partially-processed optical signals). An initial user-specific feature or set-of-features, that were initially extracted for an authenticated user, may be stored and may be referred to as a "reference feature" or "reference features".

In a subsequent usage session, a "fresh" user or a "current" user may attempt to authenticate to the system; and the user-specific feature extractor 151 may extract a fresh or a current user-specific feature for that fresh user or current user. The freshly-extracted feature value, may be compared by a features matching/comparing unit 153 to the previously-extracted or previously-stored user-specific feature(s) of one or more previously-authenticated user(s), or to the user-specific features that were already extracted in the past for a particular previously-authenticated user. If a match is found (e.g., if the features are identical, or are generally identical, or are generally similar, or are similar by at least a pre-defined similarity threshold), then the user authentication module 133 may declare that the user is authenticated. If a match is not found, then the user authentication module 133 may declare that the user is not authenticated, and may optionally trigger further actions (e.g., trigger a process which gives to the user a "second attempt" for authentication; trigger a process that notifies a fraud department or a security team about a possible fraud; trigger a process that requires the user to perform other steps or additional steps for authentication; or the like).

In some embodiments, the features matching/comparing unit 153 may optionally comprise, or may be associated with, a Similarity Estimator 154 or similarity estimation unit or similarity estimation module, or a similarity score generator, able to compare between the fresh indicator and the historic indicator, and able to determine a similarity score indicating how similar (or how dissimilar) the fresh indicator value is, relative to the historic indicator value. The similarity score, or other similarity indicators, may be used in order to determine whether a fresh sample "matches" (is sufficiently similar to) a previously-stored sample, and/or in order to determine whether a fresh sample "matches" (is sufficiently similar to) a pre-defined reference value. Optionally, one or more similarity threshold values may be used, in order to enable the similarity estimator 154 to determine whether a current similarity score indicates sufficient similarity to a previous sample or to a reference value.

In a demonstrative example, if user David has provided one or more historic samples, in which user David had a moustache; and currently user David shaved his moustache; then, a fresh sampling of the optical signal that is reflected back from the user David, may still be similar to the historic optical reflections that were produced when user David had a beard; and/or the fresh sampling of the optical signal that is reflected from the user David, may be more similar to the historic sampling, relative to fresh sampling that are collected from an impostor or attacker Henry. In other words, the similarity between (i) the current user David without moustache, and (i) the previous user David who had a moustache, may be greater than the similarity between (I) a current user Henry, and (II) the previous user David who had a moustache.

It is noted that some embodiments of the present invention need not necessarily utilize a repository for long-term storage of extracted user-specific features; and/or need not necessarily perform a comparison process or a matching process of a fresh feature against a historic feature or against a pool of previously-extracted features; and/or need not necessarily require a "training period" in which features are firstly collected and only subsequently they are actually used for authentication. Rather, some embodiments may operate autonomously and immediately without comparing or matching a fresh user-extracted feature to a previously-extracted feature; for example, by comparing a freshly-extracted feature of a current user, to one or more reference values or threshold values which may indicate that the current user lacks Liveness, or that a Replay Attack may be taking place.

In a first example, user Adam may attempt to authenticate to the system as if he was user Bob, by standing in front of system 100, and by holding a real-life size printed photograph of the face of user Bob, while also initiating playback of a recorded audio message in which user Bob was recorded saying "My name is Bob Smith". Although the audio sample may match the user-specific voice of user Bob, the system of the present invention may utilize its optical microphone to deduce that the "facial regions" of the user that attempts to authenticate, do not vibrate (at all, or sufficiently), or they do not vibrate in a manner that corresponds to the utterances that were heard acoustically; and therefore the reflected optical signals do not match those that were expected to be received if indeed a Live user Bob was standing and speaking there. The flat image of the photograph, that is being held by the impostor Adam, does not reflect back the optical signals or the laser beam(s), in the same manner that a Live person having actual face would reflect them, with the facial skin vibrations that are involved.

In a second example, the system may similarly detect that the impostor user Adam is standing in front of the system, and instead of holding a photograph of the real user Bob, the impostor Adam holds a tablet (or smartphone) which shows an audio-video clip in which user Bob's face is clearly seen saying "My name is Bob Smith". The flat screen of the tablet (or smartphone) that is being held by the impostor Adam, does not reflect back the optical signals or the laser beam(s), in the same manner that a Live person having actual face would reflect them, with the facial skin vibrations that are involved.

In a third example, the system may similarly detect that the impostor user Adam is standing in front of the system, and instead of holding a photograph of the real user Bob, the impostor Adam holds a three-dimensional doll or manikin or sculpture that resembles the real face of user Bob, and also playbacks a recorded audio clip in which the real user Bob says "My name is Bob Smith". The three-dimensional doll or manikin or sculpture that is being held by the impostor Adam, even if user Adam causes it to move (e.g., similar to a puppet master that moves the lips of a puppet), does not reflect back the optical signals or the laser beam(s), in the same manner that a Live person having actual face would reflect them, with the facial skin vibrations that are involved.

In a fourth example, the system may similarly detect that the impostor user Adam is standing in front of the system, and moves his lips to say the words "My name is Bob Smith", while at the same time user Adam also playbacks a recorded audio clip in which the real user Bob says "My name is Bob Smith". The unique facial features of user Adam, may vibrate in a different manner and may reflect the optical signals and/or the laser beams differently when compared to the reflection of optical signals by the facial regions of the real user Bob; and the system may thus detect or may estimate that a Replay Attack is being performed.

The above-mentioned fraud attempts may thus be detected, by a Liveness detector 155, and/or by a Replay Attack detector 156, which may be pre-configured to detect such fraud attempts based on an analysis that indicates that the reflected optical signal—for example, reflected back from a photograph or from a screen or from a doll—does not exhibit facial vibrations that would have been expected if a real-life user would attempt to authenticate. In a demonstrative implementation, the fresh user-extracted features that were extracted by using the optical microphone, may be compared to a reference value or a reference threshold value of, for example, minimum vibrations that are expected to be exhibited by a face of a speaking human; thereby enabling the system to estimate or detect a replay attack, or to confirm (or deny) Liveness of a current user It is noted that the Liveness Detector 155 may estimate, or may determine, or may take into account, determinations with regard to velocity of the reflected optical signal(s) that are reflected back from the skin of the human speaker towards the optical microphone 101; since such velocity may be utilized by the Liveness Detector 155 and/or by the optical microphone 101 (or by a spectrum analysis unit thereof) in order to estimate or determine the elasticity or the relative-elasticity of the skin (e.g., facial skin) of the human speaker. Applicants have realized the human skin and/or human membrane differ from other objects in the characteristics of reflected optical signals, including the velocity thereof; and furthermore, the characteristics of the optical signals that are reflected from the facial skin of Person A are different from those reflected from the facial skin of Person B. The velocity of the reflected optical signal(s) may also be affected by body movements (e.g., which may be in a pre-defined velocities range, such as a range of high velocities that is higher than a pre-defined threshold), and/or may be affected by speech movements (e.g., which may be in a pre-defined velocities range, such as a range of low velocities, and/or may be characterized by having a low amplitude that is lower than a threshold amplitude value, and/or in a particular range of speech frequencies that may be lower than a threshold frequency value). Accordingly, the Liveness Detector 155 may utilize a skin elasticity module or sub-unit, to estimate the facial skin elasticity of a particular human speaker, based on the velocity or velocities or range-of-velocities of the optical signal(s) that are reflected back from the skin of the human speaker.

The user authentication module 133 may optionally comprise a Voice/Speech Biometric Module 157, able to collect a fresh audio sample or a fresh acoustic sample (e.g., through the acoustic microphone 102) from a current user attempting to authenticate; and able to compare it or match it, or to otherwise perform biometric analysis on it, in relation to a previously-collected acoustic sample or acoustic signature or audio sample or audio signature. Optionally, the user authentication module may authenticate a user based on a combination of two conditions: (I) if the fresh output of the optical microphone indicates a match with a previous output thereof, and (II) if the fresh acoustic sample is identical or similar to a previously-captured acoustic sample. In another embodiment, for example, the user authentication module may authenticate a user based on a combination of two conditions: (I) if the freshly-extracted user-specific feature of the current user, matches a previously-extracted feature of a particular previously-authenticated user; and (II) if the fresh acoustic sample is identical or similar to a previously-captured acoustic sample The user authentication module 133 (or system 100) may optionally comprise an acoustic signal enhancer unit 158, able to enhance or improve or filter the acoustic signal captured by the acoustic microphone 102, based on an the self-mix signal of the optical microphone 101, or based on an analysis of the self-mix signal of the optical microphone. For example, the acoustic signal enhancer unit 158 may comprise or may utilize a dynamic filter generator 159, able to dynamically construct and apply (to the acquired acoustic signal) a digital filter to clean the acoustic signal and/or reduce noise from the acoustic signal and/or otherwise increase the Signal to Noise Ratio (SNR) of the acoustic signal. Then, the enhanced or filtered or cleaned acoustic signal, may be utilized by the Voice/Speech Biometric Module 157, optionally in combination with the similarity of the reflected optical signal as analyzed by the self-mix process in the optical microphone, in order to authenticate the user.

It is noted that in some implementations, the Voice/Speech Biometric Module 157 may utilize one or more other types of acoustic samples or data samples, or a voice sample or voice print, which may not necessarily be merely an acoustic recording or raw acoustic sounds, and/or which may not necessarily be a cleaned or digitally-cleaned or filtered or digitally-filtered acoustic recording or acoustic data. For example, the Voice/Speech Biometric Module 157 may optionally utilize, in addition to or instead of the other samples or data as described above, one or more of the following as part of a user authentication process: (a) the speech signal, or estimated or detected speech signal, as determined by the optical microphone 101 based on an analysis of the self-mixed optical signals; (b) an acoustic sample as captured by the acoustic microphone 102, by itself and/or in combination with the speech signal estimated by the optical microphone 101; (c) an acoustic sample as captured by the acoustic microphone 102 and as cleaned or digitally-cleaned or filtered or digitally-filtered or otherwise digitally-adjusted or digitally-modified based on the speech signal estimated by the optical microphone 101; (d) a voice print or speech sample which is acquired and/or produced by utilizing one or more biometric algorithms or sub-modules, such as a Neural Network module or a Hidden Markov Model (HMM) unit, which may utilize both the acoustic signal and the optical signal (e.g., the self-mixed signals of the optical microphone 101) in order to extract more data and/or more user-specific characteristics from utterances of the human speaker.

The user authentication module 133 (or system 100) may optionally comprise a facial vibrations estimator 159, able to estimate or determine or detect one or more properties or user-specific features or characteristics, of vibrations of the skin or face, or skin-portions or skin regions, or face portions or face regions, which vibrate or move as the human speaker utters words or speaks. Applicants have realize that every human speaker may have a unique and user-specific set of facial features, which in turn may cause a different type of facial vibrations, or may cause facial vibrations having different and user-specific features or characteristics, that can be measured remotely by using a remote optical microphone (e.g., optical microphone 101). The reflected optical signal which is reflected from the face of the human speaker, when self-mixed by the optical microphone 101 with the outgoing optical signal (or a copy or replication thereof), may enable the optical microphone 101 to perform a spectral analysis of the self-mixed optical signal, and to extract therefrom user-specific characteristics that correspond to the unique facial vibrations of each human user, which in turn correspond to unique user-specific physiological features (e.g., size of mouth and lips; size of nose and chin), behavioral features (e.g., the manner in which the user pronounces the sound "S" or the sound "Z" or the sound "O"), and/or other user-specific features (e.g., whether or not the user has a beard or a moustache, which may hide some of the facial skin and thus may cause less vibrations when compared to a speaker that does not have a beard and a moustache). Accordingly, the user authentication module 133 may thus extract the characteristics of facial vibrations of a speaker; and may utilize them subsequently, by themselves and/or in combination with other biometric features and/or authentication factors, in order to authenticate the user.

In a demonstrative implementation, the facial vibrations estimator 159 may comprise or may utilize, or may be associated with, for example: (a) an estimator of facial vibrations amplitude, able to estimate the user-specific amplitude (or strength, or intensity) of facial vibrations of a human speaker (e.g., or a statistical function or other function related to such amplitude, such as the average or mean amplitude over a time-slot); (b) an estimator of facial vibrations characteristics, able to estimate or extract other user-specific features that relate to, or describe, the facial vibrations of the human speaker. These units may operate by analyzing the self-mix signal of the optical microphone 101, by using one or more spectral analysis techniques.

The user authentication module 133 (or system 100) may optionally comprise a speckles estimator 160 able to estimate or determine or detect one or more properties or user-specific features or characteristics, such as amount and/or size and/or pattern and/or vibrations, of speckles (or speckle noise) that may occur when the optical signal (e.g., one or more laser beams) are transmitted from the optical microphone 101, reach or "hit" the face of the human speaker, and are reflected back therefrom. Applicants have realized that due to the different and unique facial features of every human speaker, each human face may cause different, user-specific, speckles or speckle-noise, which may have unique characteristics; which may be estimated by performing spectral analysis of the self-mix signal in the optical microphone 101; thereby extracting a unique, user-specific, feature or set-of-features, which may then be utilized for user authentication, by itself (or by themselves) and/or in combination with other biometric features and/or authentication parameters.

It is noted that in some embodiments, the optical microphone 101 may not, or does not, acquire a visible "image" of the speckles noise or speckles pattern, since such speckles may not be readily visible to human eye or to an imager; but rather, the optical microphone 101 and/or the speckles estimator 160 may estimate or may determine the temporal behavior or the temporal characteristics of the power reflected back from the head of the human speaker, which in turn may indicate, or may enable the speckles estimator 160 to estimate, the speckles noise pattern or characteristics, which in turn may be a user-specific characteristic since speckles noise may depend, among other parameters, on the particular three-dimensional features of the face of the human speaker and/or its characteristics (e.g., beard, moustache) and/or its activity (e.g., the manner in which the speaker moves his face-regions when pronouncing certain words or phrases or utterances).

In a demonstrative implementation, the speckles estimator 160 may comprise or may utilize, or may be associated with, for example: (a) a speckles pattern estimator or detector, able to detect or estimate a user-specific pattern of speckles (e.g., a generally circular pattern of speckles for user Adam, or a generally egg-shaped or oval pattern of speckles for user Bob); (b) a speckles amount estimator or detector, able to detect or estimate a number or an amount of speckles or speckle-points or speckle-batches (e.g., three speckle-batches for user Adam who has a beard; and seven speckle-batches for user Jane who does not have a beard); (c) a speckles vibrations estimator or detector, able to estimate or detect the level or relative-level of vibrations of speckles or of speckle-noise or speckle-points of a user (e.g., speckles of user Adam vibrate or move or shift rapidly, or are displaced rapidly over time, relative to pre-defined threshold values of velocity and/or displacement; whereas, speckles of user Jane vibrate or move or shift slowly, or are displaced slowly over time, relative to said pre-defined threshold values of velocity and/or displacement). Other user-specific speckles-related features may be extracted or estimated or detected, and may then be used for user authentication, by themselves and/or in combination with other biometric features, user-specific features, and/or authentication parameters.

The user authentication module 133 (or system 100) may optionally comprise a facial movement estimator 161 able to estimate or determine or detect one or more properties or facial movements (e.g., moving or tilting of the entire head, or portions thereof), based on an analysis of the self-mix signal as processed by the optical microphone 101. Applicants have realized that each human speaker may exhibit certain user-specific head-movements when speaking in general, or may uttering certain words or sounds in particular; including movement of the entire head or face, or movement of particular face regions or face portions or body parts (e.g., movement of lips, jaws, chin). In some implementations, an imager or camera may acquire an image and/or video of the human speaker or of the face area or head area of the human speaker; and the facial movement estimator 161 may operate by analyzing or extracting head movements or facial movements that characterize a particular speaking user. Additionally or alternatively, the facial movement estimator may extract or estimate such user-specific face movements or head movements, of a speaking user, from the self-mixed optical signal of the optical microphone. For example, a reflected spectrum characteristics detector may extract from the self-mixed optical signal, spectral characteristics that indicate the effect user-specific head movements or face movements on the spectrum of the reflected optical signal and thus on the spectrum of the self-mixed signal. Such extracted user-specific features may then be used for user authentication, by themselves and/or in combination with other biometric features, user-specific features, and/or authentication parameters.

In some embodiments, system 100 and/or the user authentication module may comprise, or may utilize, a three-dimensional-model generator 162 able to generate a three-dimensional model or representation of the face or head (of face-regions or face-portions) of the human speaker, based on spectral analysis of the self-mixed optical signal. Optionally, a laser transmitter or other optical beam transmitter of the optical microphone 101 or of system 100, may move (e.g., by using a motor, or other displacement mechanism) in order to "scan" the entire face of the user or portions thereof; and/or a matrix or array of multiple laser beams or optical beams may be transmitted towards the face of the speaker (e.g., using multiple laser transmitters or multiple optical transmitters); and/or an optics assembly (e.g., beam splitter(s), beam divider(s), prisms, lenses, mirrors, and/or other suitable optic elements) may be utilized in order to allow a single optical transmitter (or multiple optical transmitters) to utilize a multiplicity of optical beams or laser beams, for scanning multiple regions of the face or head of the human speaker. Based on the received (reflected) optical signal(s), and/or based on the self-mixed signal(s) in the optical microphone 101, a three-dimensional model may be constructed or generated, corresponding to three-dimensional features of the face or head of the human speaker, which affect differently and in a user-specific manner the vibrations of the facial skin of the user, which in turn affect differently the reflected optical signal and thus the self-mixed signal. The generated user-specific three-dimensional model, may then be used for user authentication, by itself and/or in combination with other biometric features, user-specific features, and/or authentication parameters.

User authentication module 133 may be associated with, or may comprise, or may utilize, or may operate in conjunction with, one or more other Biometric/Behavioral Identification Unit(s) 163, which may collect, capture, acquire, process, extract and/or analyze other user-specific features; for example, an imager and a face recognition module; a voice/speech recognition module; a fingerprints reader and analyzer; a retina scanner or eye scanner; a palm scanner or hand scanner; a unit that tracks and/or extracts behavioral features of a user that may be performed prior to, or subsequently to, or during, an authentication process (e.g., identifying that a user rotates or tilts or spins or lifts an authentication device or a handheld device, prior to or during or after an authentication process); and/or other suitable units. Optionally, user authentication module 133 may operate after, or during, or before, or in parallel to, a process in which the user is requested or required to perform one or more operations (e.g., to speak and say an utterance; to pose for an image; to provide a fingerprint sample; to swipe a magnetic card; to utilize a physical token for authentication), and/or in addition to (or instead of) performing one or more other authentication steps or authentication factors (e.g., entering a password or passphrase or Personal Identification Number (PIN); answering a security question; responding to a security challenge; solving a CAPTCHA challenge; or the like).

Some embodiments of the present invention may comprise an optical microphone or laser microphone or a laser-based microphone, or optical sensor or laser sensor or laser-based sensor, which utilizes multiple lasers or multiple laser beams or multiple laser transmitters, in conjunction with a single laser drive component and/or a single laser receiver component, thereby increasing or improving the efficiency of self-mix techniques or module or chamber (or self-mix interferometry techniques or module or chamber) utilized by such optical or laser-based microphone or sensor.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

Some embodiments of the present invention may comprise, or may utilize, or may be utilized in conjunction with, one or more elements, units, devices, systems and/or methods that are described in U.S. Pat. No. 7,775,113, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,286,493, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,949,118, titled "System and method for robust estimation and tracking the fundamental frequency of pseudo periodic signals in the presence of noise", which is hereby incorporated by reference in its entirety.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a system comprises: an optical microphone (a) to transmit an outgoing optical signal towards a face of a human speaker, (b) to receive an incoming optical feedback that is reflected back from said face of said human speaker, (c) to perform self-mix interferometry that is based on said outgoing optical signal and said incoming optical signal, and (d) based on said self-mix interferometry, to generate a user-specific characteristic that characterizes said human speaker; and a user authentication module to authenticate said user for performing a privileged action, based on said user-specific characteristic that was generated from said self-mix interferometry.

In some embodiments, the user authentication module is to authenticate a user based on a comparison between: (i) a freshly-generated user-specific characteristic that is freshly generated for a current user who attempts to authenticate via said optical microphone, and (ii) a previously-generated user-specific characteristic that was previously generated by an authorized user that was authenticated via said optical microphone.

In some embodiments, the system comprises: a similarity estimation unit to determine a similarity score indicating a level of similarity between (i) a freshly-generated user-specific characteristic that is freshly generated for a current user who attempts to authenticate via said optical microphone, and (ii) a previously-generated user-specific characteristic that was previously generated by an authorized user that was authenticated via said optical microphone; wherein the user authentication module is to authenticate said current user if said similarity score is greater than a pre-defined similarity threshold.

In some embodiments, the system comprises: an acoustic microphone to capture acoustic output that is produced by said human user; a dynamic filter generator to dynamically generate a digital filter for cleaning noises from said acoustic output that was captured by the acoustic microphone, based on output produced by said optical microphone, and to produce a dynamically-cleaned acoustic sample; wherein the user authentication module is to authenticate said user for performing said privileged action, based on a combination of both: (i) said user-specific characteristic that was generated from said self-mix interferometry, and (ii) biometric similarity between said dynamically-cleaned acoustic sample and a previously-captured acoustic sample of said human user.

In some embodiments, the system comprises: an amplitude of facial vibrations estimator, to receive output generated by said optical microphone, and to generate therefrom a facial vibration indicator value that indicates a level of vibrations of a facial region of said human speaker; wherein the user authentication module comprises a facial vibrations similarity detector, to detect a level of similarity between: (i) a freshly-generated facial vibrations indicator value, that is freshly generated for a current user who attempts to authenticate via said optical microphone, and (ii) a previously-generated facial vibrations indicator value that was previously generated by an authorized user that was authenticated via said optical microphone; wherein said user authentication module is to authenticate said current user based on output indicating said level of similarity that is produced by said facial vibrations similarity detector.

In some embodiments, the system comprises: a speckles pattern detector, to extract, from a self-mix optical signal of said optical microphone, a unique user-specific pattern of speckles that characterize the incoming optical signal that is reflected back from said human user; wherein the user authentication module comprises a speckles pattern similarity detector, to detect a level of similarity between: (i) a freshly-generated speckles pattern, that is freshly generated for a current user who attempts to authenticate via said optical microphone, and (ii) a previously-generated speckles pattern that was previously generated by an authorized user that was authenticated via said optical microphone.

In some embodiments, the system comprises: a speckles vibrations detector, to extract, from a self-mix optical signal of said optical microphone, a unique user-specific vibrations pattern of vibrating speckles that characterize the incoming optical signal that is reflected back from said human user; wherein the user authentication module comprises a speckles pattern similarity detector, to detect a level of similarity between: (i) a freshly-generated speckles vibrations pattern, that is freshly generated for a current user who attempts to authenticate via said optical microphone, and (ii) a previously-generated speckles vibrations pattern that was previously generated by an authorized user that was authenticated via said optical microphone.

In some embodiments, the system comprises: a speckles amount detector, to extract, from a self-mix optical signal of said optical microphone, a unique user-specific number indicating an amount of speckles that characterize the incoming optical signal that is reflected back from said human user; wherein the user authentication module comprises a speckles pattern similarity detector, to detect a level of similarity between: (i) a freshly-generated speckles amount number, that is freshly generated for a current user who attempts to authenticate via said optical microphone, and (ii) a previously-generated speckles amount number that was previously generated by an authorized user that was authenticated via said optical microphone.

In some embodiments, the system comprises: a facial movement detector, to utilize output generated by said optical microphone in order to generate a unique user-specific number indicating a level of movement of a face of a speaking user, that characterize a manner in which said speaking user moves his head while speaking; wherein the user authentication module comprises a facial movement similarity detector, to detect a level of similarity between: (i) a freshly-generated facial movement indicator, that is freshly generated for a current user who attempts to authenticate via said optical microphone, and (ii) a previously-generated facial movement indicator that was previously generated by an authorized user that was authenticated via said optical microphone.

In some embodiments, the system comprises: an average reflected spectrum detector, to utilize output generated by said optical microphone in order to generate a unique user-specific number indicating an average of a spectrum of reflected optical signals that are reflected from a face of a speaking user, that characterize a manner in which the face of said speaking user reflects optical signal; wherein the user authentication module comprises a facial movement similarity detector, to detect a level of similarity between: (i) a freshly-generated average reflected spectrum indicator, that is freshly generated for a current user who attempts to authenticate via said optical microphone, and (ii) a previously-generated average reflected spectrum indicator that was previously generated by an authorized user that was authenticated via said optical microphone.

In some embodiments, the system comprises: one or more laser receivers, to receive multiple laser beams that are reflected from said face of said human user; a three-dimensional-model generator to analyze the multiple reflected laser beam and their relation to said outgoing optical signal, and to generate therefrom a three-dimensional-model that corresponds to physiological features of said face of said human user; wherein the user authentication module comprises a three-dimensional-model similarity detector, to detect a level of similarity between: (i) a freshly-generated three-dimensional-model of physiological facial features, that is freshly generated for a current user who attempts to authenticate via said optical microphone, and (ii) a previously-generated three-dimensional-model of physiological facial features, that was previously generated by an authorized user that was authenticated via said optical microphone.

In some embodiments, the system comprises: a plurality of laser transmitters to transmit a plurality of laser beams towards said face of said human user.

In some embodiments, the system comprises: a single laser transmitter to transmit a single laser beam at a time; a motor to move said single laser transmitter, and to cause said single laser transmitter to transmit said single laser beam over time towards different regions of said face of said human user.

In some embodiments, the system comprises: a single laser transmitter to transmit a single laser beam at a time; a beam splitter to split said single laser beam into two or more laser beams that reach different regions of said face of said human user.

In some embodiments, the system comprises: a replay attack detector to detect that a fraudulent authentication attempt is attempted by a replay of a non-fresh previously-recorded acoustic sample, based on a difference between (I) fresh speckles noise of a freshly-captured reflected optical signal, and (II) previously-determined speckles noise that characterized a previous acoustic sample of a previously-authenticated user.

In some embodiments, the system comprises: a liveness detector to detect liveness of a current user who attempts to authenticate by uttering a speech, wherein the liveness detector is to compare between: (I) a freshly generated output of said optical microphone that receives fresh optical signal reflected from said current user, and (II) an expected optical signal that is expected to be reflected from said current user if said current user is actually uttering said speech.

In some embodiments, the system comprises: a speckles pattern detector, to extract, from a self-mix optical signal of said optical microphone, a unique user-specific pattern of speckles that characterize the incoming optical signal that is reflected back from said human user, based on spectral analysis of temporal behavior of power of optical signals reflected from said human speaker; wherein the user authentication module comprises a speckles pattern similarity detector, to detect a level of similarity between: (i) a freshly-generated speckles pattern, that is freshly generated for a current user who attempts to authenticate via said optical microphone, and (ii) a previously-generated speckles pattern that was previously generated by an authorized user that was authenticated via said optical microphone.

In some embodiments, the system comprises: an acoustic microphone to capture acoustic output that is produced by said human user; a Neural Network module to apply a neural network algorithm that extracts a user-specific characteristic from both: (I) an acoustic signal acquired by the acoustic microphone, and (II) reflected optical signals that are reflected back from the human speaker to the optical microphone; wherein the user authentication module is to authenticate said user for performing said privileged action, based on said user-specific characteristics that was extracted from both: (I) the acoustic signal acquired by the acoustic microphone, and (II) the reflected optical signals that are reflected back from the human speaker to the optical microphone.

In some embodiments, the system comprises: an acoustic microphone to capture acoustic output that is produced by said human user; a Hidden Markov Model (HMM) unit to construct a Hidden Markov Model (HMM) that indicates a user-specific characteristic from both: (I) an acoustic signal acquired by the acoustic microphone, and (II) reflected optical signals that are reflected back from the human speaker to the optical microphone; wherein the user authentication module is to authenticate said user for performing said privileged action, based on said user-specific characteristics that was extracted from both: (I) an acoustic signal acquired by the acoustic microphone, and (II) reflected optical signals that are reflected back from the human speaker to the optical microphone.

In some embodiments, the system comprises: a liveness detector to detect liveness of a current user who attempts to authenticate by uttering a speech, wherein the liveness detector is to estimate facial skin elasticity of the human speaker based on spectral analysis of reflected optical signals that are reflected back from the human speaker to the optical microphone.

In some embodiments, the optical microphone is part of a hybrid optical-and-acoustic sensor which is further able to acquire an acoustic signal of said human speaker.

In some embodiments, the optical microphone is embedded in an electronic device selected from the group consisting of: a smartphone, a tablet, a laptop computer.

The present invention comprises devices, systems, and methods of voice-based user authentication utilizing a challenge. For example, a system includes a voice-based user-authentication unit, to authenticate a user based on a voice sample uttered by the user. A voice-related challenge generator operates to generate a voice-related challenge that induces the user to modify one or more vocal properties of the user. A reaction-to-challenge detector operates to detect a user-specific vocal modification in reaction to the voice-related challenge; by using a processor as well as an acoustic microphone, an optical microphone, or a hybrid acoustic-and-optical microphone. The voice-based user-authentication unit utilizes the user-specific vocal modification, that was detected as reaction to the voice-related challenge, as part of a user-authentication process.

In a first demonstrative example, during the speech of a user, the system generates or adds a background noise or a continuous background noise, or increases the volume of an already-existing background noise (e.g., increasing the volume of background music that plays in a check-in lobby of an office; increasing the volume of music that plays in a vehicular radio system or audio system). In accordance with the Lombard Effect or the Lombard Reflex, many users may raise the volume of their voice, or may increase their vocal effort, or may otherwise perform modifications to their vocal output in reaction to (or, as a response to) the increase in background noise, or in reaction to the introduction of a new background noise, or in reaction to the increase in volume of background noise. Such modifications of speech may be user-specific, such that every user may perform one or more, or some, or all of the modifications in a particular manner; for example, change of pitch or tone, change or speaking rate (e.g., words per second, or syllables per second), change of pronunciation of certain words (e.g., clearer pronunciation of certain words to ensure that they are received well over the background noise), change in the duration or the emphasis of certain words or syllables, and/or even change of the content of utterances or speech (e.g., a user that typically says "I can't" may change this phrase to "I cannot" when he encounters a loud background noise, to ensure that his utterance is received correctly and is not interpreted as "I can"). At least some of such changes and modifications may be unique to a certain user, and thus may be monitored, detected, recorded, analyzed, and subsequently may be utilized in order to verify or confirm the user identity or as part of a user-authentication process.

Additionally, each user may exhibit a different or a slightly-different delay or time-gap, between: (i) the introduction of the loud (or louder) background noise, and (ii) the speech modification by the speaker (e.g., the speaker raises his voice and reduces his syllables-per-second speech rate). For example, user Adam may be generally more alert and/or may have better hearing and/or may be equipped with a hearing aid device and/or may be more sensitive to background noises, and may thus respond rapidly to such changes in the background noise, and may react to them within T1 milliseconds. In contrast, user Bob may be generally less alert and/or may have reduced hearing, or may be less sensitive to background noises, and may react to them within T2 milliseconds, wherein T2 is greater than T1, or wherein T2 is greater than T1 by at least K percent (e.g., at least 25 or 50 percent larger). Accordingly, said time-gap or delay may be indicative of the user, and may be utilized as part of the user-authentication process.

In a second demonstrative embodiment, the system may generate or introduce a challenge that is not based on background noise or background music or background sounds, but rather, a challenge that is based on introduction of interfering speech. While the user speaks, the system generates and/or plays-back an audio speech-portion that interferes with the user's words; and each user reacts to such interference in a different manner, and/or each user exhibits a different reaction, as well as a different time-gap until he reacts, to such interfering speech.

For example, while user Carl is talking to a "personal assistant" module or unit or service (e.g., similar to Apple Ski or to Microsoft Cortana or Amazon Alexa), the system generates an interfering speech, particularly an interfering speech that is spoken in the same (or similar) voice of that "personal assistant" module or unit or service. For example, while user Carl is saying, "Siri how to do I get from home to the Broadway Theater", the system injects—while the user is still speaking, after he says the word "from"—an audio interference that says "Would you like to travel there by car or by walking?". Each user reacts differently to such interference; a first user may ignore it and continue his planned speech; a second user may pause in silence for two seconds before repeating his original speech unchanged; a third user may pause in silence for one second and may then utter a modified phrase of speech; a fourth user may say a different phrase but may also increase his speech volume in response to the interfering speech; and so forth, thereby enabling the system to detect and utilize such user-specific reactions as part of a user-authentication decision-making processes.

In a third demonstrative implementation, the system generates an interfering speech while the user is talking, or, the system introduces an additional speech once the user stops talking; and the reaction of the user to such speech or injected speech or interference speech or added speech from the system, may be user-specific or may be indicative of the user or may be utilized for user-authentication purposes. For example, while the user talks, or immediately after the user talks, the system generates and plays-back an audio message that says "I am sorry, I did not hear get this, can you please repeat what you have just said". In response to this "challenge", user David may repeat what he previously said in the same exact words; whereas, user Earl may re-phrase his previous sentence and say it differently; whereas, user Fred may repeat his previous sentence but change the manner in which he emphasizes certain words in it, or may improve the pronunciation of certain words; whereas, user Gail may repeat her previous sentence but say it slower than before and/or louder than before; whereas, user Harry may re-phrase his previous sentence into a shorter version conveying the same content (e.g., shortening the previous sentence from 9 words to 6 words); whereas, user Isabelle may re-phrase her previous sentence into a longer version conveying the same content (e.g., adding words such as "the" or "that" or "which" or "then" to her previous sentence, thereby changing it from 5 words to 7 words). Each such user-specific manner of reaction, to the request of the voice-based interface, may be tracked, detected, and then utilized for user-authentication purposes.

Figure 2:
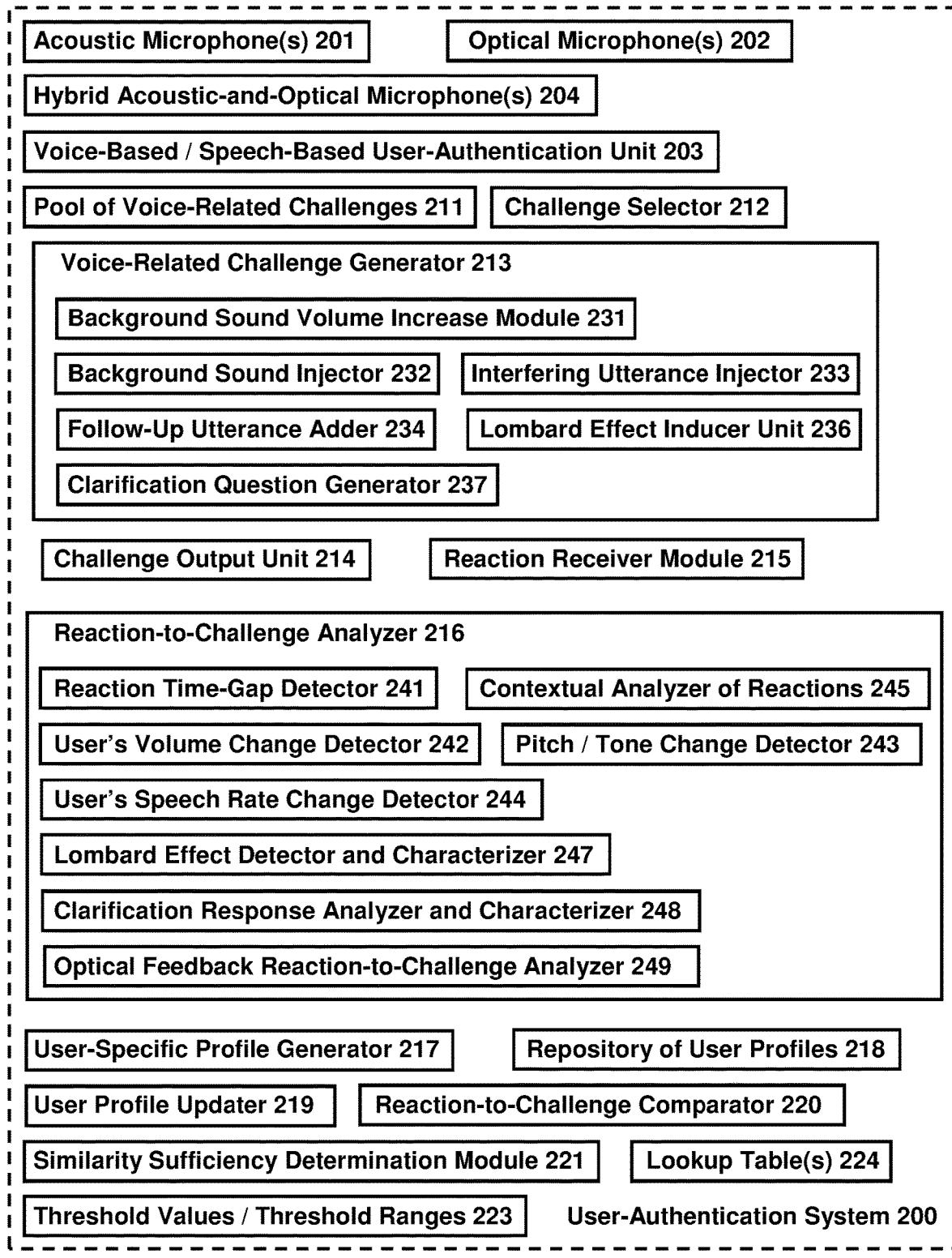
FIG. 2 is a schematic block-diagram illustration of a user-authentication system, in accordance with some demonstrative embodiments of the present invention.

Reference is made to FIG. 2, which is a schematic block-diagram illustration of a user-authentication system 200, in accordance with some demonstrative embodiments of the present invention. System 200 may be a demonstrative implementation of user authentication module 133; or may be part of user authentication module 133; or may be part of system 100; or may be a stand-alone system or unit, or may be part of another system or unit.

System 200 may comprise, for example, one or more acoustic microphone(s) 201 and/or one or more optical microphone(s) 202. In some implementations, optionally, system 200 comprises a combined or hybrid acoustic-and-optical microphone 204 or hybrid acoustic-and-optical sensor, or a set or array of microphones or hybrid microphones or sensors.

System 200 may comprise a voice-based/speech-based user-authentication unit 203, able to perform voice-based or speech-based user-authentication. For example, the unit tells to the user (via an audio clip that is played; or via an audio-video clip that is played; or via a textual prompt) to say a particular phrase (e.g., "my voice is my passport"), or to answer a question ("What is your date of birth?"). The acoustic microphone 201 captures and records the user's speech or a sample thereof; and/or, the optical microphone 202 captures the optical feedback reflected from the user's face-area, or a sample thereof. In some implementations, the acoustic data and/or the optical data is compared to a pre-defined sample or pattern or acoustic features and/or optical features that were pre-defined for that particular user (e.g., who also identifies himself to the system using a badge or tag or magnetic card or physical token); and the authentication is granted or denied based on whether or not there is sufficient similarity between the sampled data and the pre-defined data for that particular user (e.g., beyond a pre-defined threshold level of similarity). In other implementations, the acoustic data and/or the optical data collected from the user, is compared to each one of a set of samples that correspond to multiple, different, persons that are candidates for positive authentication (e.g., to samples of each one of the employees of an office; to samples of all each one of the personnel who are authorized to operate a certain machine; or the like), and if a sufficiently-similar match is found between the collected sample and one particular sample of an authorized person then a positive authentication is granted.

The system 200 performs voice-based user-authentication based on the differences in voice and/or voice behavior and/or voice characteristics among different people. Particularly, one or more voice-related Challenges are generated and presented to the user; the system then monitors and tracks the particular manner in which the user (the speaker) reacts or responds to the Challenge(s), and utilizes this reaction as part of the user-authentication decision-making process. The Challenges may increase or improve the accuracy of voice-based authentication, or of user-authentication that operates with regard to speech or utterances of a human user; and/or may reduce the length of time or the size of sample(s) of speech or utterances or voice which are required for ensuring a pre-defined level of accuracy or reliability.

For example, a pool of voice-related challenges 211 stores definitions for multiple, different, types of challenges that may be introduced or injected or added to the voice-based user-authentication process. For example, a first type of challenge is generating a new background noise while the user talks; a second type of challenge is increasing the volume of an already-existing background noise while the user talks; a third type of challenge is injecting an interfering speech-segment while the user talks; a fourth type of challenge is presenting a repeat-request once the user completed his speech, or the like.

A voice-related challenge selector module 212 selects a particular type of challenge, from the pool of voice-related challenges 211. In some embodiments, the selection is random or pseudo-random. In other embodiments, the selection is based on a pre-defined sequence or order of challenges which defines in which order challenges are selected or applied. In still other embodiments, the selection is based on external parameters or conditions; for example, selecting a first type of challenge on weekdays (word-days) and selecting a second type of challenge on weekends, or, selecting a first type of challenge if access is requested into a private office and selecting a second type of challenge if access is requested into a lobby area; or, selecting a first type of challenge if access is required to a first type of device (e.g., smartphone), and selecting a second type of challenge if access is required to a second type of device (e.g., laptop, or vehicle). Other selection considerations may be used.

A voice-related challenge generator 213 then operates to generate the actual challenge and to present it or to playback it to the user. For example, the challenge generator 213 may utilize a pre-defined challenge template, that may be pre-defined with each type of challenge; and optionally, may populate it with one or more data-items, or may modify it based on modification rules. In a first example, the selected challenge is of the type of "increasing the volume of the background music in the lobby area by 25 percent"; the challenge generator 213 performs such volume increase by commanding the audio system of the lobby to increase the volume of speakers. In a second example, the selected challenge is of the type of "increasing the volume of the background music in the lobby area by N percent"; the challenge generator 213 firstly selects a value for N from a list of pre-defined values (such as, 30 or 40 or 50 percent), and then performs such volume increase by commanding the audio system of the lobby to increase the volume of speakers by the selected N percent value. In a third example, the selected challenge is of the type "inject an interfering speech while the user is talking"; and the challenge generator 213 selects and injects a particular interference phrase from a set of two more interference phrases that are available for injection.

The challenge generator 213 may operate in conjunction with, or may command, a Challenge Output Unit 214 which conveys the challenge to the user. The Challenge Output Unit 214 may be or may comprise, for example, audio speakers, display units, and/or other output devices.

A Reaction Receiver module 215 operates to sense and/or capture and/or record the response or reaction of the user to the presented (or played-back) challenge. For example, the reaction receiver module 215 operates the acoustic microphone 201 to capture audio or acoustic reaction of the user, and/or the reaction receiver module 215 operates the optical microphone 202 to capture optical feedback reflected from the user's facial area in reaction to the presented challenge.

A Reaction-to-Challenge Analyzer module 216 operates to analyze the captured reaction to the presented challenge. For example, the user Adam authenticates himself for the first time to an entry system to his office, via a magnetic card and also via voice-based authentication that does not necessarily comprise a voice-based challenge; and a user-specific profile generator 217 generates a user-specific profile for user Adam, which reflects his acoustic features and/or optical feedback features; and the profile is stored in a Repository of User Profiles 218. On the next, the user Adam authenticates again to the same system, which this time presents him the voice-related or voice-based challenge, such as, an increase in the volume of background music in the office lobby; and user Adam produces a response or reaction to this challenge. The Reaction-to-Challenge Analyzer module 216 analyzes the sensed or sampled data (acoustic and/or optical), and extracts from it one or more user-specific features and/or user-specific characteristics that characterize the response or reaction of user Adam to the challenge; such as, (i) that user Adam responded to the challenge by increasing his voice volume by 45 percent, and/or (ii) that it took user Adam three seconds to notice the increase in volume and to react to it, and/or (iii) that user Adam also reacted to the challenge by repeating (by uttering again) the same four words that he uttered just before he detected the challenge (the interference).

Accordingly, a User Profile Updater module 219 operates to update the user-specific profile of Adam, that is stored in the Repository of User Profiles 218, such that the user-specific profile of Adam would further reflect not only his "regular" or his "un-interrupted" or his "un-challenged" acoustic and/or optical characteristics, but also, would reflect also his "reaction to challenge" acoustic and/or optical characteristics, to be used in subsequent authentication operations. The "reaction to challenge" acoustic and/or optical characteristics of each user, may be stored as augmented data in the Repository of User Profiles 218, such as, as additional data-items in additional fields of each user-record in the repository; or, such "reaction to challenge" acoustic and/or optical characteristics of each user may be stored in a separate and/or dedicated repository, e.g., a Repository of User-Specific Reactions to Challenges 219, which optionally may be implemented separately from the Repository of User Profiles 218 (e.g., for enhanced security) or may be linked to the Repository of User Profiles 218.

Subsequently, when user Adam attempts to authenticate again to the system, one or more challenges are generated or added or introduced or injected into the voice-based or speech-based user-authentication process; and the Reaction to such challenge(s) is captured and analyzed. A Reaction-to-Challenge Comparator module 220 operates to compare the fresh reaction of the user that is being authenticated, to a previously-detected or previously-stored reaction (or type of reaction) that was pre-determined for that particular user (or, for each user out of a plurality of user whose profiles are checked for a match, serially or sequentially).

For example, in a fresh authentication session, user Adam raises his voice volume by 43 percent when he encountered the loud background music, and it took user Adam approximately 2.1 seconds to start raising his voice since the volume of the background music was increased. The Reaction-to-Challenge Comparator module 220 may thus determine that these features of the fresh reaction to the fresh challenge, are sufficiently close or sufficiently similar or sufficiently matching to the previously-recorded or previously-detected features of reaction of user Adam, such as, based on a pre-defined threshold level of similarity. For example, the reference profile of user Adam indicates that he raises his voice by 45 percent; and the fresh sample indicates raising his voice by 43 percent, which is within N percent (e.g., within 10 percent) above or under the pre-defined reference reaction. Similarly, the reference profile of user Adam indicates that he starts raising his voice 2 seconds after beginning of the increasing of the volume of the background music; and the fresh sample indicates that he now raised his voice after 2.1 seconds of the increase in the volume of the background music, and the time-gap of 2.1 seconds is within K percent (e.g., within 12 percent) above or under the pre-defined reference reaction of 2 seconds time-gap. The fresh identification of these user-specific reaction features, are taken into account towards reaching a positive authentication decision, or are used to base a positive authentication decision. In contrast, when user Bob attempts to authenticate as if he is user Adam, but user Bob does not raises his voice at all when he encounters background music, then the system rejects or denies the authentication attempt by Bob as it does not match the reference reaction-features that were previously identified for user Adam. Optionally, the Reaction-to-Challenge Comparator module 220 may utilize a Similarity Sufficiency determination module 221, to determine whether the sampled reaction is sufficiently similar to a pre-defined reaction of a particular user; for example, based on utilization of one or more Threshold Values/Threshold Ranges 223, and/or by utilizing one or more Lookup Table(s) 224 that indicate whether certain freshly-sampled values are to be considered sufficiently-similar to certain other reference values (e.g., a lookup table that indicates that a reaction delay of 2.1 seconds is considered sufficiently similar to a reference reaction delay of 2 seconds; and that indicate that a reaction delay of 5 seconds is not considered sufficiently similar to a reference reaction delay of 2 seconds).

It is noted that the Repositories mentioned above may be utilized for a group of persons (e.g., employees of an organization), or in some implementations may be tailored to a single user. For example, a smartphone or a laptop computer or a tablet or a vehicle, may be configured to authenticate only a single authorized user (e.g., the single owner of that item), based on voice-based authentication that takes into account the user's reaction to such challenges. In such implementation, the "repositories" may comprise a single record, indicating the acoustic and/or optical features that characterize the reaction(s) of that particular user to a particular challenge; or optionally, may comprise one or more records indicating the acoustic and/or optical features that characterize the reaction(s) of that particular user to several different types of challenges.

In some embodiments, optionally, the challenge generator 213 may be implemented as, or by using, multiple sub-units or sub-modules, for example, each one of them configured or adapted to generate a particular type of voice-based challenge or speech-related challenge or speed-modifying challenge or voice-modifying challenge. For example: (A) a Background Sound Volume Increase Module 231 may operate to increase the volume of an already-existing background sound (e.g., music in the lobby; music in the vehicle); (B) a Background Sound Injector 232 may operate to introduce a new, not-yet-existing, background noise or background sound, particularly during an already-occurring speech that is currently uttered by the user that is being authenticated; (C) an Interfering Utterance Injector 233 may operate to introduce, inject and/or play-back an interfering speech or utterance during an occurring utterance of the user that is being authenticated; (D) a Follow-Up Utterance Adder 234 may operate to add or to play-back an additional audio phrase or audio utterance after the user ended his speech (or, after detecting at least T milliseconds of silence of the user), such as, particularly, a Repeat Request (e.g., an audio segment saying "Please repeat your last sentence for me"), or optionally implemented as a Repeat-Request Generator 235; (E) a Lombard Effect Inducer Unit 236, which may operate to perform one or more other or additional suitable operations, e.g., introduction or adding of amplification of noise or background noise or ambient sounds(s) or interfering speech segments, or other operations that are targeted to cause vocal modification of the speech of the speaker.

Similarly, the Reaction-to-Challenge Analyzer module 216 may be implemented as, or using, multiple sub-modules or sub-unit; for example: (a) a Reaction Time-Gap Detector 241, able to determine or detect or measure and/or quantify the time gap between the commencement of the voice-based challenge and the commencement of the actual reaction of the user; (b) a User's Volume Change Detector 242, able to determine and/or quantify a change in the volume (loudness) of the voice of the user in reaction to the challenge; (c) a User's Pitch/Tone Change Detector 243, able to determine and/or quantify a change in the pitch and/or tone of the user in reaction to the challenge; (d) a User's Speech Rate Change Detector 244, able to determine and/or quantify a change in the rate or speed of the user's speech in reaction to the challenge (e.g., detecting that the user slowed-own his speech rate, from 5 syllables per second prior to the challenge, to 3 syllables per second in reaction to the challenge); (e) a Contextual Analyzer of Reactions 245, which may optionally utilize a Speech Recognition module 246, able to recognize the speech of the user (e.g., convert from speech to text and identify words and phrases in a natural language) and able to determine that in response to an interference the user has repeated the last N words that he said, or that in response to the interference the user had re-phrased his speech in a different manner (e.g., replaced his previous utterance of "I can't" with a new utterance of "I cannot" while keeping all the other sentence components unchanged), optionally utilizing a Natural Language Processing (NPL) algorithm or lookup table; (f) a Lombard Effect Detector and Characterizer Unit 247 able to detect, as detailed above or herein, one or more other vocal changes and/or acoustic features and/or optical-feedback changes or properties, that indicate that the user is experiencing a Lombard Effect or a Lombard Reflex, and/or able to determine one or more (user-specific) features and/or characteristics of the Lombard Effect exhibited by that user, for user-authentication purposes; and/or other suitable modules or units.

It is noted that the Repeat Request Generator is only a demonstrative example of a "clarification question" that may be introduced or injected or added once the user completes to utter his speech; and other suitable clarification questions may be utilized, in order to induce a user-specific type-of-reaction that can then be utilized for user-authentication purposes. For example, a user may utilize a voice-based interface to command a device (a smartphone, a vehicle, or the like), "give me directions to 123 Broadway please". In response, and even if there is only one particular Broadway road or street in the nearby area (e.g., within 50 miles radius), the system may generate an audible clarification question, such as, "Did you mean Broadway Boulevard or Broadway Avenue?"; and the system may monitor the user's reaction to such clarification question. For example, out of all the users that are presented with this clarification question and that intended to mean "Broadway Avenue", user Adam may react by uttering "Broadway Avenue"; whereas user Bob may react by uttering "I meant Broadway Avenue"; whereas user Carl may react by uttering "the Avenue"; whereas user David may react by uttering "Avenue". This different pattern, and length, and detail-level, of each type of reaction, may subsequently be used as part of the user authentication process; for example, observing that user Bob tends to utter a long or detailed response to the clarification question, whereas user David tends to utter a short and less-detailed response to the clarification question; thereby enabling the system to differentiate among users based on their response or reaction to such clarification question. In some embodiments, the clarification question may be generated and presented to the user via a dedicated unit or sub-module, such as a Clarification Question Generator 237; and the response or reaction to the clarification question may be detected and/or analyzed, and its features may be extracted or deduced, via a Reaction to Clarification Response analyzer and characterizer module 248.

Some embodiments may take into account, in the user-authentication process, particular non-audible components of the reaction of the user to the challenge, and/or particular optical-feedback characteristics of the reaction of the user to the challenge. For example, an Optical Feedback Reaction-to-Challenge Analyzer 249 may operate to particularly identify and utilize non-audible reactions of the user to the challenge, such as, that user Bob typically opens his mouth to perform a silent (non-audible) sigh when he is interrupted by an interfering challenge; or to detect that user Carl, knowingly to him or even unknowingly to him, vibrates his chin or his cheeks at a certain frequency of vibration when encountered with a loud background music that interferes with his speech. Accordingly, the optical feedback that is collected and analyzed by a laser-microphone or a vibrometer or other optical microphone, may utilize, for user authentication purposes, one or more user-reaction features or characteristics that are non-audible and/or are non-acoustic, and even are non-visible to a human eye, or are typically non-detectable by a security camera or a similar imager that analyzes still photos or that analyzes video frames. This may improve or enhance the level of security that is enabled by the system; and may also prevent, eliminate or mitigate a "replay attack" in which an impostor attempts to play-back a recorded acoustic sample as part of a speech-based or voice-based authentication process.

In some embodiments, the user-authentication process of the present invention need not be known to the user, or may be unknown to the user, such that the user may not even be aware that he is presented with a voice-related or speech-related challenge. For example, some of the challenges that were described above, may appear to a naïve or unsuspecting user as natural phenomena or as naturally-occurring conditions (e.g., loud music; noise in background; the system "not understanding" the user and thus requesting him to repeat, or interrupting him mid-sentence). Such hidden properties of the challenge may contribute to, or may improve, the security or reliability of the user-authentication process; since an attacker or an impostor may not even be aware that there are challenge(s) presented to him and/or that his reaction(s) to such challenge(s) are tracked and analyzed as part of a user-authentication process.

In some implementations, optionally, the user authentication may be a continuous process or an ongoing process, and need not necessarily be a separate or stand-alone process. For example, user Carl authenticates to his own laptop computer and accesses his banking application, and continues to operate his banking application via voice commands for ten minutes; such as, uttering voice commands to check his balance, uttering voice commands to check his recent transactions, uttering voice commands to check prices of particular stocks, uttering voice commands to transfer funds between accounts, or the like. Even though user Carl has already authenticated to his laptop computer and/or to his banking application, the banking application continues to monitor his reaction to challenges presented to him, in order to further confirm his user identity along the usage session. For example, while user Carl performs his third operation in the banking application, by using voice commands, the banking application injects or introduces loud background music, and captures and analyzes the reaction of the user to this interference; and by comparing it to previously-observed reactions of the "real" or the genuine user Carl, the banking application may determine whether the current user (who is now requesting to perform a wire transfer) is indeed the legitimate user or the genuine user, or alternatively is an impostor or attacker. Accordingly, some embodiments of the present invention may perform continuous authentication of the user, in a seamless manner, and even if the user has already logged-in or has already/recently authenticated to the system or to the service or to the device.

In some embodiments, the user-authentication process of the present invention may enable a system, a computerized system, an electronic device, a vehicle, a banking website, a physical gate, a physical restricted area, and/or other system or device, to protect itself and/or to defend itself against unauthorized users and/or intruders and/or impostors and/or attackers and/or hackers and/or illegitimate users; and/or may enable such devices or systems to actively and/or autonomously and/or automatically block or deny or reject or avert an intrusion or an attack; and/or may enable such devices or systems to initiate one or more fraud mitigation operations (e.g., requiring the user to authenticate via other means and/or via additional authentication factors; requiring the user to interact with a human representative or with a fraud department; or the like); thereby enabling such systems and devices to operate at increased level of security and/or reliability, and to be more resistant to attacks or breaches.

In some embodiments, a system comprises: a voice-based user-authentication unit, to authenticate a user based on a voice sample uttered by said user; a voice-related challenge generator, to generate a voice-related challenge that induces said user to modify one or more vocal properties of said user; a reaction-to-challenge detector, to detect a user-specific vocal modification in reaction to said voice-related challenge; wherein the voice-based user-authentication unit utilizes said user-specific vocal modification, that was detected as reaction to said voice-related challenge, as part of a user-authentication process that either approves or denies authentication of said user.

In some embodiments, the voice-related challenge generator comprises a Lombard Effect inducing module which is operable to introduce background sounds that induces said user to increase his voice volume in a particular user-specific manner; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific features of the Lombard Effect exhibited by said user.

In some embodiments, the voice-related challenge generator comprises a background noise generator module which is operable to produce a new not-yet-existing background noise while said user is uttering speech; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said new background noise that was introduced by the background noise generator.

In some embodiments, the voice-related challenge generator comprises an ambient sound volume-increase module which is operable to increase a playback volume of an already-existing ambient sound while said user is uttering speech; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said increase in the volume of an already-existing ambient sound.

In some embodiments, the voice-related challenge generator comprises an interfering speech injector module which is operable to inject a playback of an interfering speech-segment while said user is uttering speech; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said injected interfering speech-segment.

In some embodiments, the voice-related challenge generator comprises a repeat-request generator module which is operable to generate an audible request that the user would repeat his vocal input; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said audible request to repeat his vocal input.

In some embodiments, the voice-related challenge generator comprises a repeat-request generator module which is operable to generate an audible request that the user would repeat his vocal input; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated Natural Language Processing (NPL) unit are operable to detect and to characterize user-specific wording changes that are exhibited by said user in reaction to said audible request to repeat his vocal input.

In some embodiments, the voice-related challenge generator comprises an audible question generator module which is operable to generate an audible clarification question directed to the user; wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific response features exhibited by said user in reaction to said audible clarification question.

In some embodiments, the voice-based user-authentication unit compares between (i) a fresh reaction of said user to the voice-related challenge presented to said user, and (ii) a user-profile indicating characteristics of one or more previous reactions of said user to said voice-related challenge.

In some embodiments, the voice-based user-authentication unit compares between (i) a fresh reaction of said user to the voice-related challenge presented to said user, and (ii) each profile of a group of authorized users having respective user-profiles that indicate characteristics of previous reactions of said users authorized users to said voice-related challenge.

In some embodiments, the voice-based user-authentication unit performs ongoing, continuous, voice-based confirmation of user identity even after said user is initially authenticated, based on one or more voice-related challenges that are introduced to a voice-based interaction of said user with a computerized system.

In some embodiments, the reaction-to-challenge detector comprises an optical microphone and an associated processor, which operate to remotely sense and characterize user-specific facial vibrations of said user in response to said voice-based challenge; wherein said voice-based user-authentication unit utilizes said user-specific facial vibrations of said user in response to said voice-based challenge, as part of said user-authentication process.

In some embodiments, the reaction-to-challenge detector comprises an optical microphone and an associated processor, which operate to remotely sense and characterize user-specific facial vibrations of said user in response to said voice-based challenge; wherein said voice-based user-authentication unit utilizes said user-specific facial vibrations of said user in response to said voice-based challenge, as part of said user-authentication process, wherein said user-specific facial vibrations are non-detectable by an acoustic microphone, and wherein said user-specific facial vibrations are non-detectable by a security camera aimed at said user.

In some embodiments, the reaction-to-challenge detector comprises an acoustic microphone and an associated processor, which are configured (i) to remotely sense and characterize user-specific facial vibrations of said user in response to said voice-based challenge, and also (ii) to sense and characterize user-specific vocal-modification features exhibited by said user in response to said voice-based challenge; wherein said voice-based user-authentication unit utilizes, as part of said user-authentication process, both (i) the user-specific facial vibrations of said user in response to said voice-based challenge, and also (ii) the user-specific vocal-modification features exhibited by said user in response to said voice-based challenge.

In some embodiments, the reaction-to-challenge detector comprises a hybrid acoustic-and-optical microphone and an associated processor, which operate to sense and characterize user-specific vocal-modification features exhibited by said user in response to said voice-based challenge; wherein said voice-based user-authentication unit utilizes said user-specific vocal modification features exhibited by said user in response to said voice-based challenge, as part of said user-authentication process.

In some embodiments, wherein the voice-based user-authentication unit operates to grant or to deny access of said user to at least one of: a smartphone, a tablet, a smart-watch, a laptop computer, a desktop computer, a portable electronic device.

In some embodiments, the voice-based user-authentication unit operates to grant or to deny access of said user to at least one of: a vehicle, a vehicular module, a vehicular door, a module that starts a vehicle, an office, a building, an apartment, a house, a turnstile, a physical door, a physical gate, a restricted physical area.

In some embodiments, the reaction-to-challenge detector comprises a laser self-mix microphone and an associated processor; wherein the laser self-mix microphone (i) transmits an outgoing laser beam towards said user, and (ii) receives incoming optical feedback reflected from said user in response to said outgoing laser beam hitting said user, and (iii) performs laser self-mix interferometry of said outgoing laser beam and said incoming optical feedback, and (iv) by utilizing said associated processor, generates a user-specific characteristic that characterizes user-specific facial vibrations of said user in response to said voice-based challenge; wherein said voice-based user-authentication unit utilizes said user-specific characteristic that characterizes user-specific facial vibrations of said user in response to said voice-based challenge, as part of said user-authentication process.

In some embodiments, a method comprises: at a voice-based user-authentication unit, authenticating a user based on a voice sample uttered by said user; at a voice-related challenge generator module, generating a voice-related challenge that induces said user to modify one or more vocal properties of said user; at a reaction-to-challenge detector module, detecting a user-specific vocal modification in reaction to said voice-related challenge; at said voice-based user-authentication unit, utilizing said user-specific vocal modification, that was detected as reaction to said voice-related challenge, as part of a user-authentication process that either approves or denies authentication of said user.

In some embodiments, the method is implemented by a laser self-mix microphone and an associated processor; wherein the method comprises: at said laser self-mix microphone, (i) transmitting an outgoing laser beam towards said user, and (ii) receiving incoming optical feedback reflected from said user in response to said outgoing laser beam hitting said user, and (iii) performing laser self-mix interferometry of said outgoing laser beam and said incoming optical feedback, and (iv) by utilizing said associated processor, generating a user-specific characteristic that characterizes user-specific facial vibrations of said user in response to said voice-based challenge; at said voice-based user-authentication unit, utilizing said user-specific characteristic that characterizes user-specific facial vibrations of said user in response to said voice-based challenge, as part of said user-authentication process.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
    a voice-based user-authentication unit, to authenticate a user based on a voice sample uttered by said user;
    a voice-related challenge generator, to generate a voice-related challenge that induces said user to modify one or more vocal properties of said user;
    a reaction-to-challenge detector, to detect a user-specific vocal modification in reaction to said voice-related challenge;
    wherein the voice-based user-authentication unit utilizes said user-specific vocal modification, that was detected as reaction to said voice-related challenge, as part of a user-authentication process that either approves or denies authentication of said user;
    wherein the reaction-to-challenge detector comprises a laser self-mix microphone and an associated processor,
    wherein the laser self-mix microphone (i) transmits an outgoing laser beam towards said user, and (ii) receives incoming optical feedback reflected from said user in response to said outgoing laser beam hitting said user, and (iii) performs laser self-mix interferometry of said outgoing laser beam and said incoming optical feedback, and (iv) by utilizing said associated processor, generates a user-specific characteristic that characterizes user-specific facial vibrations of said user in response to said voice-based challenge;
    wherein said voice-based user-authentication unit utilizes said user-specific characteristic that characterizes user-specific facial vibrations of said user in response to said voice-based challenge, as part of said user-authentication process.

2. The system of claim 1,
    wherein the voice-related challenge generator comprises a Lombard Effect inducing module which is operable to introduce background sounds that induces said user to increase his voice volume in a particular user-specific manner;
    wherein the reaction-to-challenge detector comprises a microphone, selected from the group consisting of: (i) an acoustic microphone, (ii) an optical microphone, (iii) a hybrid acoustic-and-optical microphone device,
    wherein said laser self-mix microphone and said associated processor are operable to detect and to characterize user-specific features of the Lombard Effect exhibited by said user.

3. The system of claim 1,
    wherein the voice-related challenge generator comprises a background noise generator module which is operable to produce a new not-yet-existing background noise while said user is uttering speech;
    wherein the reaction-to-challenge detector comprises a microphone, selected from the group consisting of: (i)

an acoustic microphone, (ii) an optical microphone, (iii) a hybrid acoustic-and-optical microphone device, wherein said laser self-mix microphone and said associated processor are operable to detect and to characterize user-specific vocal features exhibited by said user in reaction to said new background noise that was introduced by the background noise generator.

4. The system of claim 1, wherein the voice-related challenge generator comprises a repeat-request generator module which is operable to generate an audible request that the user would repeat his vocal input;

wherein the reaction-to-challenge detector comprises a microphone, selected from the group consisting of: (i) an acoustic microphone, (ii) an optical microphone, (iii) a hybrid acoustic-and-optical microphone device, wherein said microphone and said associated processor are operable to detect and to characterize user-specific vocal features exhibited by said user in reaction to said audible request to repeat his vocal input.

5. The system of claim 1, wherein the voice-related challenge generator comprises a repeat-request generator module which is operable to generate an audible request that the user would repeat his vocal input;

wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated Natural Language Processing (NPL) unit are operable to detect and to characterize user-specific wording changes that are exhibited by said user in reaction to said audible request to repeat his vocal input.

6. The system of claim 1, wherein the voice-related challenge generator comprises an audible question generator module which is operable to generate an audible clarification question directed to the user;

wherein the reaction-to-challenge detector comprises a microphone, selected from the group consisting of: (i) an acoustic microphone, (ii) an optical microphone, (iii) a hybrid acoustic-and-optical microphone device, wherein said microphone and a said associated processor are operable to detect and to characterize user-specific response features exhibited by said user in reaction to said audible clarification question.

7. The system of claim 1, wherein the voice-based user-authentication unit compares between (i) a fresh reaction of said user to the voice-related challenge presented to said user, and (ii) a user-profile indicating characteristics of one or more previous reactions of said user to said voice-related challenge.

8. The system of claim 1, wherein the voice-based user-authentication unit compares between (i) a fresh reaction of said user to the voice-related challenge presented to said user, and (ii) each profile of a group of authorized users having respective user-profiles that indicate characteristics of previous reactions of said users authorized users to said voice-related challenge.

9. The system of claim 1, wherein the voice-based user-authentication unit performs ongoing, continuous, voice-based confirmation of user identity even after said user is initially authenticated, based on one or more voice-related challenges that are introduced to a voice-based interaction of said user with a computerized system.

10. The system of claim 1, wherein said user-specific facial vibrations are non-detectable by an acoustic microphone, and wherein said user-specific facial vibrations are non-detectable by a security camera aimed at said user.

11. The system of claim 1, wherein the reaction-to-challenge detector further comprises an acoustic microphone, wherein the reaction-to-challenge detector is configured (i) to remotely sense and characterize user-specific facial vibrations of said user in response to said voice-based challenge, and also (ii) to sense and characterize user-specific vocal-modification features exhibited by said user in response to said voice-based challenge;

wherein said voice-based user-authentication unit utilizes, as part of said user-authentication process, both (i) the user-specific facial vibrations of said user in response to said voice-based challenge, and also (ii) the user-specific vocal-modification features exhibited by said user in response to said voice-based challenge.

12. The system of claim 1, wherein the reaction-to-challenge detector comprises a hybrid acoustic-and-optical microphone and said associated processor, which operate to sense and characterize user-specific vocal-modification features exhibited by said user in response to said voice-based challenge;

wherein said voice-based user-authentication unit utilizes said user-specific vocal modification features exhibited by said user in response to said voice-based challenge, as part of said user-authentication process.

13. The system of claim 1, wherein the voice-based user-authentication unit operates to grant or to deny access of said user to at least one of: a smartphone, a tablet, a smart-watch, a laptop computer, a desktop computer, a portable electronic device.

14. The system of claim 1, wherein the voice-based user-authentication unit operates to grant or to deny access of said user to at least one of: a vehicle, a module that starts a vehicle, an office, a building, a turnstile, a physical door, a physical gate, a restricted physical area.

15. A system comprising:

a voice-based user-authentication unit, to authenticate a user based on a voice sample uttered by said user;

a voice-related challenge generator, to generate a voice-related challenge that induces said user to modify one or more vocal properties of said user;

a reaction-to-challenge detector, to detect a user-specific vocal modification in reaction to said voice-related challenge;

wherein the voice-based user-authentication unit utilizes said user-specific vocal modification, that was detected as reaction to said voice-related challenge, as part of a user-authentication process that either approves or denies authentication of said user;

wherein the voice-related challenge generator comprises an ambient sound volume-increase module which is operable to increase a playback volume of an already-existing ambient sound while said user is uttering speech;

wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said increase in the volume of an already-existing ambient sound.

16. A system comprising:

a voice-based user-authentication unit, to authenticate a user based on a voice sample uttered by said user;

a voice-related challenge generator, to generate a voice-related challenge that induces said user to modify one or more vocal properties of said user;

a reaction-to-challenge detector, to detect a user-specific vocal modification in reaction to said voice-related challenge;

wherein the voice-based user-authentication unit utilizes said user-specific vocal modification, that was detected as reaction to said voice-related challenge, as part of a user-authentication process that either approves or denies authentication of said user;

wherein the voice-related challenge generator comprises an interfering speech injector module which is operable to inject a playback of an interfering speech-segment while said user is uttering speech;

wherein the reaction-to-challenge detector comprises a microphone, selected from the group consisting of: (i) an acoustic microphone, (ii) an optical microphone, (iii) a hybrid acoustic-and-optical microphone device, wherein said microphone and an associated processor are operable to detect and to characterize user-specific vocal features exhibited by said user in reaction to said injected interfering speech-segment.

* * * * *